United States Patent [19]

Jelinek

[11] 4,114,906

[45] Sep. 19, 1978

[54] SEALED JOINT AND GASKET THEREFOR

[75] Inventor: Jerry G. Jelinek, La Habra, Calif.

[73] Assignee: Parker-Hannifin Corporation, Cleveland, Ohio

[21] Appl. No.: 867,253

[22] Filed: Jan. 5, 1978

Related U.S. Application Data

[63] Continuation of Ser. No. 724,955, Sep. 20, 1976, abandoned.

[51] Int. Cl.² ............................................. F16J 15/12
[52] U.S. Cl. .................................... 277/166; 277/180; 277/235 B
[58] Field of Search ................. 277/22, 166, 168, 180, 277/227, 211, 235 R, 235 B, 228

[56] References Cited

U.S. PATENT DOCUMENTS

| 3,430,611 | 3/1969 | Belter | 277/235 B X |
| 3,433,490 | 3/1969 | Teucher et al. | 277/235 B X |
| 3,448,986 | 6/1969 | Jelinek et al. | 277/235 B X |
| 3,653,673 | 4/1972 | Green | 277/227 |

Primary Examiner—Robert S. Ward, Jr.
Attorney, Agent, or Firm—John N. Wolfram

[57] ABSTRACT

This invention relates to a sealed joint and a gasket therefor in which the gasket comprises a metal plate with an opening therethrough and with a sealing member of resilient material mounted on the metal plate within the opening and attached to the metal plate about a portion only of the periphery of the sealing member, the remaining portion of the periphery being unattached and preferably slightly spaced from the plate. The joint includes a pair of members to be sealed, one of the members having a central opening and also having another opening that is in register with an opening through the resilient sealing member. The members to be sealed have faces for clamping a thickened portion of the metal plate and also for sealingly contacting the resilient sealing member. The space between the plate and the unattached portion of the sealing member acts as a heat barrier to minimize transfer of heat emanating from the central opening from the plate to the sealing member.

9 Claims, 4 Drawing Figures

SEALED JOINT AND GASKET THEREFOR

This is a continuation of application Ser. No. 724,955, filed Sept. 20, 1976, now abandoned.

BACKGROUND OF THE INVENTION

Cylinders in diesel engines create high temperatures which are transmitted to the head gaskets that are employed for sealing between the cylinder and the cylinder head and which also seal coolant passages in the cylinder and cylinder head. In some forms of head gaskets now in use, as for example the gasket disclosed in U.S. Pat. No. 3,448,986, the gasket includes a thin metal plate having a central opening communicating with the interior of the cylinder, a series of circumferentially spaced openings for registration with the coolant passages, and with a sealing member of resilient material mounted in the latter openings and in sealing contact with the cylinder and cylinder head. Because it is undesirable to transmit high heat from the cylinder to the resilient sealing members, the metal portion of the gasket has a thickened portion immediately surrounding the central opening and which is sealingly clamped between the cylinder and cylinder head. The remaining portion of the metal plate is thinner so that it will be substantially out of contact with the opposed faces of the cylinder and cylinder head and therefore carry less heat from the thickened portion to the resilient sealing member.

In recent years diesel engines of increased horsepower have been developed and which produce higher temperatures within the cylinder than formerly. This requires that additional means be provided for preventing excess heat from being transmitted to the resilient sealing members.

SUMMARY OF THE INVENTION

The present invention provides a gasket and cylinder head joint in which additional means are provided for preventing transfer of excess temperature from the interior of the cylinder to the resilient sealing members for the coolant fluid passages. This is accomplished by attaching the resilient sealing members to the metal plate of the gasket at a location radially outwardly of the central opening of the gasket that communicates with the interior of the cylinder while the remaining portion of the sealing member that is radially adjacent the gasket central opening is unattached, and preferably spaced, from the metal plate. Such space, or lack of attachment, acts as a barrier to the transfer of heat from the hotter portion of the metal plate to the resilient sealing member.

DETAIL DESCRIPTION

Figure 1:
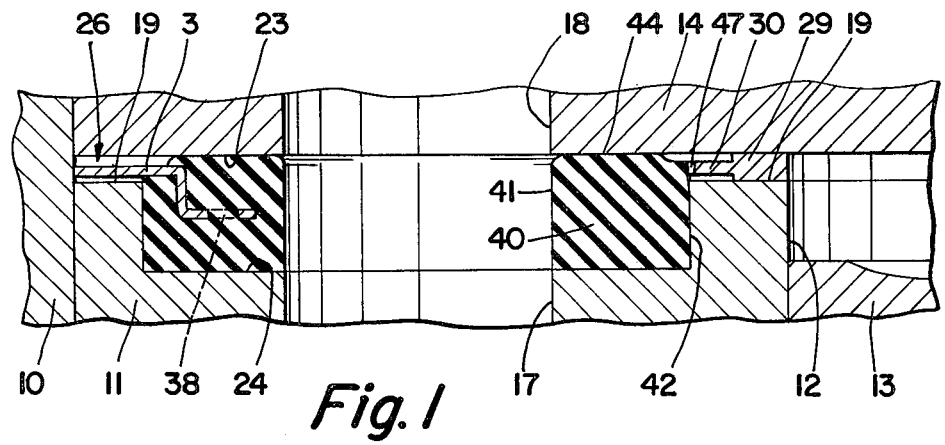
FIG. 1 is a fragmentary section view of a diesel cylinder and cylinder head with the gasket of the present invention clamped therebetween, the section through the gasket being along the lines 1—1 of FIG. 3.
Figure 2:
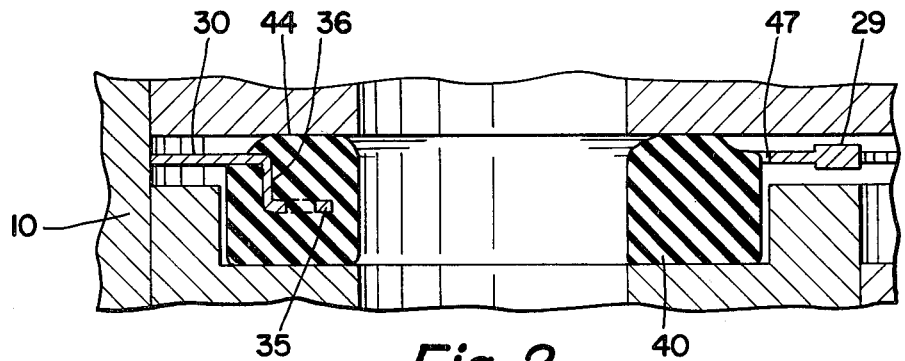
FIG. 2 is a view like FIG. 1 but showing the parts in loose assembled position.

As shown in FIG. 1, a diesel engine block 10 has therein a cylinder liner 11 that provides a bore 12 in which a piston 13 reciprocates. Bore 12 is closed at one end by a cylinder head 14.

Liner 11 and cylinder head 14 have a series of circumferentially spaced coolant passages 17, 18 that are in register with each other. Liner 11 has a flat end face 19 in which a counterbore 20 is formed and which surrounds opening 17. Cylinder head 14 has a flat face 23 that overlies cylinder face 19 and bottom wall 24 of counterbore 20.

A gasket, generally indicated as 26 comprises a continuous annular metal plate 27 with a central opening 28 therein which has a thickened portion 29 that extends in both axial directions beyond a thinner portion 30.

Thinner portion 30 has a series of circumferentially spaced openings 32 therein that comprise a radially inner portion 33 that communicates with and is on a larger radius than a radially outer portion 34. Opening portion 34 is through an axially offset portion 35 of the metal plate, the offset portion 35 being connected to the remainder of the plate by an axially extending portion 36.

Figure 3:
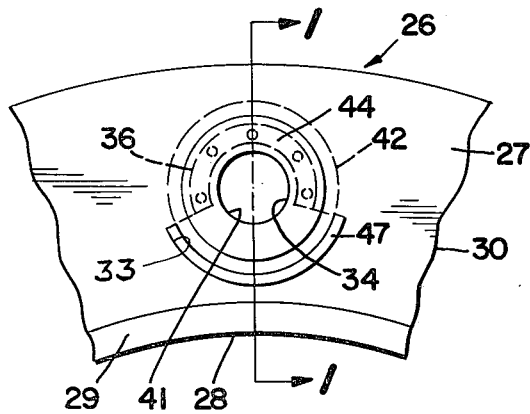
FIG. 3 is a fragmentary top view of the gasket.
Figure 4:
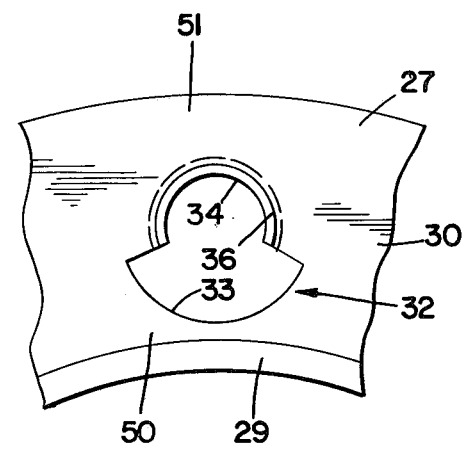
FIG. 4 is a view like FIG. 3 but with the resilient sealing member removed.

A sealing member 40 of resilient material, such as synthetic rubber, has a circular opening 31 for registering with passages 17, 18 and has an outer circular periphery 42 that is a close initial fit within counterbore 20. The offset portion 35 of the metal plate is embedded within sealing member 40 and has holes 38 therethrough through which material of the sealing member extends for making the attachment more secure. At its upper end 44 sealing member 40 extends initially axially beyond thickened portion 29 of the metal plate 27. The inner edge of portion 33 of opening 32 in the metal plate is not attached to sealing member 40 and preferably is spaced therefrom so as to provide an air gap 47 therebetween which acts as a heat barrier. As shown in FIG. 3, the air gap 47 is of uniform radial width.

When the gasket 26 is clamped into position between liner 11 and cylinder 14, as shown in FIG. 1, thickened portion 29 is tightly engaged by cylinder head surface 23 and cylinder liner surface 19 but the thinner portion 30 remains substantially out of contact with such faces. Also, resilient sealing member 40 is clamped between cylinder head face 23 and the bottom wall 24 of counterbore 20 to seal coolant passages 17, 18.

When the diesel engine is in use, high heat developed within cylinder bore 12 is transmitted to the thickened portion 29 of the gasket and travels radially outwardly in the gasket from thickened portion 29. Thinner portion 30 acquires some of this heat but not as much as if it were in clamping contact with faces 23 and 19. Nevertheless, the temperature of that section 50 of the thin portion that is between thickened portion 29 and opening portion 33 may be so high that it could transfer more heat to the resilient member 40 than the latter can accommodate. Meanwhile, because of temperature gradient, the section 51 of the thin portion that is radially outwardly of opening portion 34 results in section 51 being of less temperature than section 50 and low enough so that it will not damage the sealing member by contact therewith. Thus, the sealing member 40 is attached to the cooler portion 51 of the metal plate and is unsecured, and preferably spaced from, the hotter portion, 50 of the plate.

I claim:

1. A gasket comprising a metal plate having a first opening therethrough in which fluid at high temperature may be received and having a second opening therethrough in which fluid at a lower temperature may be received, a sealing member of resilient material in said second opening, said metal plate surrounding said sealing member and being fixedly secured thereto throughout a first portion only of the periphery of said sealing member, the remaining portion of said periphery being unattached to said plate, said unattached portion having no metallic member therein and being located between said openings whereby heat in said first opening is less readily transferable through the plate to said sealing member at said remaining portion than at said first portion.

2. The gasket of claim 1 in which said plate is embedded within said sealing member only at said first portion and said remaining portion spans substantially the entire width of the sealing member between said openings.

3. The gasket of claim 1 in which said plate is radially spaced from said remaining portion.

4. The gasket of claim 1 in which said space extends substantially completely across said sealing member between said sealing member and said first opening.

5. A sealed joint comprising a first member having a bore for receiving high temperature fluid surrounded by a first end face and having a first opening through the face for receiving a fluid of lower temperature, a second member overlying the first member and having a second face overlying the first face, a gasket between said faces, said gasket comprising a metal plate having a central opening in register with said bore and having a thickened portion surrounding said central opening and a thinner portion radially outward of said thickened portion, a second opening through said thinner portion, a sealing member of resilient material mounted on said thinner portion within said second opening and having a third opening in register with said first opening, said thinner portion surrounding said sealing member and being attached thereto throughout a first portion only of the periphery of the sealing member and being unattached to the remainder of said periphery, said first portion extending about the side of the sealing member remote from the central opening, and said remaining portion being located between the central opening and said sealing member, said thickened portion being clamped between said faces, said first and second members being substantially out of contact with said sealing member.

6. The joint of claim 5 in which said remaining peripheral portion of the sealing member is radially spaced from said plate.

7. The joint of claim 5 in which said radial spacing is uniform.

8. The gasket of claim 5 in which said second opening has two intersecting arcuate portions comprising a first arcuate portion of smaller radius located remote from said central opening and a second arcuate portion of larger radius located adjacent said central opening.

9. The gasket of claim 6 in which said space extends completely across said sealing member between the sealing member and said first opening.

* * * * *